(12) United States Patent
Andersen

(10) Patent No.: US 7,716,284 B2
(45) Date of Patent: May 11, 2010

(54) SUBSYSTEM-SCOPING ARCHITECTURE FOR BREAKOUT ROOMS IN A VIRTUAL SPACE

(75) Inventor: Hans C. Andersen, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 921 days.

(21) Appl. No.: 11/364,804

(22) Filed: Feb. 28, 2006

(65) Prior Publication Data

US 2007/0203980 A1    Aug. 30, 2007

(51) Int. Cl.
  *G06F 15/16*    (2006.01)
(52) U.S. Cl. .................... 709/204; 709/217; 709/219; 709/200; 370/260; 370/229; 370/235
(58) Field of Classification Search ......... 709/201–205, 709/229, 231, 248, 238, 217, 219, 200; 370/260, 370/236, 261, 252, 229, 235, 62
See application file for complete search history.

(56) References Cited

U.S. PATENT DOCUMENTS

| | | | | |
|---|---|---|---|---|
| 5,625,407 | A * | 4/1997 | Biggs et al. .............. | 348/14.11 |
| 5,974,446 | A | 10/1999 | Sonnenreich et al. | |
| 6,381,444 | B1 | 4/2002 | Aggarwal et al. | |
| 6,721,410 | B1 * | 4/2004 | Will ...................... | 379/202.01 |
| 6,772,335 | B2 * | 8/2004 | Curtis et al. ................ | 713/163 |
| 2002/0059379 | A1 * | 5/2002 | Harvey et al. ............... | 709/205 |
| 2002/0065926 | A1 | 5/2002 | Hackney et al. | |
| 2002/0071540 | A1 | 6/2002 | Dworkin | |
| 2002/0138590 | A1 | 9/2002 | Beams et al. | |
| 2002/0174248 | A1 * | 11/2002 | Morriss ...................... | 709/238 |
| 2003/0235277 | A1 * | 12/2003 | Fuller et al. .............. | 379/88.13 |
| 2004/0006595 | A1 * | 1/2004 | Yeh et al. .................... | 709/204 |
| 2004/0103137 | A1 * | 5/2004 | Irving et al. ................ | 709/200 |
| 2005/0003330 | A1 | 1/2005 | Asgarinejad et al. | |
| 2005/0021796 | A1 * | 1/2005 | McClain et al. ............. | 709/229 |

(Continued)

FOREIGN PATENT DOCUMENTS

CA    2357291    3/2003

(Continued)

OTHER PUBLICATIONS

Centra, Feb. 8, 2004, Client Tools FAQ http://web.archive.org/web/*/http://edweb.centra.com/jobaids/ClientToolsFAQs.htm http://web.archive.org/web/20040208073514/http://edweb.centra.com/jobaids/ClientToolsFAQs.htm.*

(Continued)

*Primary Examiner*—Wing F Chan
*Assistant Examiner*—Benjamin M Thieu
(74) *Attorney, Agent, or Firm*—Perkins Coie LLP

(57) ABSTRACT

A method, system, and architecture for providing a web conference system that efficiently provides a breakout room or multiple breakout rooms within a single web conference (also referred to herein interchangeably as a "meeting" or "virtual meeting") is provided. In some embodiments, the web conference system architecture provides a web conference system that allows for the creation of breakout rooms within a single web conference, where each breakout room provides a named view onto each feature subsystem of the web conference, with or without separate permission levels on each view. Each breakout room may also provide a named view of the contents of the web conference, with or without separate permission levels on each view.

18 Claims, 9 Drawing Sheets

U.S. PATENT DOCUMENTS

| | | | |
|---|---|---|---|
| 2005/0055306 A1 | 3/2005 | Miller et al. | |
| 2005/0091579 A1 | 4/2005 | Mewherter et al. | |
| 2005/0114475 A1 | 5/2005 | Chang et al. | |
| 2005/0114527 A1 | 5/2005 | Hankey et al. | |
| 2005/0276405 A1* | 12/2005 | Fernandes et al. | 379/202.01 |
| 2007/0067387 A1* | 3/2007 | Jain et al. | 709/204 |

FOREIGN PATENT DOCUMENTS

| | | |
|---|---|---|
| KR | 10-2003-0069430 | 8/2003 |
| WO | WO 00/04478 | 1/2000 |
| WO | WO 01/01372 | 1/2001 |
| WO | WO 2005/004085 | 1/2005 |

OTHER PUBLICATIONS

Elluminate, Inc., © 2004, Elluminate Feature Report http://www.baylor.edu/content/services/document.php?id=14794.*

Elluminate, Inc. © 2001-2005, ELive_Moderators_Guide_6.5, pp. 157-161 http://www.elluminate.com/support/docs/ELive_Moderators_Guide_6.5.pdf.*

"Facilitating a Real-Time Virtual Lab," Elluminate Feature Report, accessed 2006 from internet http://www.elluminate.com/support/docs/Elluminate_Feature_Report_Virtual_Lab.pdf, 2 pages.

Bouras, Ch. and Th. Tsiatsos, "Building Educational Virtual Environments," http://lttf.ieee.org/icalt2002/proceedings/p103.pdf, pp. 547-548.

Centra Software, IVCi, www.ivci.com, eweek Magazine, 2003 http://www.ivci.com/pdf/web_conferencing_centra_overview.pdf, 3 pages.

Cisco Systems, Miercom Lab Testing Summary Report on Cisco MeetingPlace and Cisco Video Telephony solution, Oct. 2004, http://www.cisco.com/application/pdf/en/us/guest/netsol/ns165/c654/cdccont_0900aecd801b3612.pdf, 4 pages.

International Search Report for International Patent Application No. PCT/US2007/001032, Microsoft Corporation, Jun. 20, 2007 (3 pages).

* cited by examiner

SUBSYSTEM-SCOPING ARCHITECTURE FOR BREAKOUT ROOMS IN A VIRTUAL SPACE

BACKGROUND

A common classroom technique is to divide students up into several small groups, each of which works on a separate problem. At a later point in time, the instructor brings the students back together to report on the findings and progress of the individual groups. Members of a project team may likewise be divided up into several small groups, where each group is assigned one or more tasks to perform and/or solve. Periodically, a project manager may bring the members of the project team back together to report on the work of the individual groups.

E-Learning and "virtual classroom" products allow each student to be at a separate computer system, such as a personal computer ("PC") and, instead of a classroom, meet in an online virtual space, often using web conferencing software, such as MICROSOFT's Live Meeting. While E-Learning and virtual classroom products may support the scenario of "breaking out" into smaller groups, current E-Learning and virtual classroom products that support this feature implement each "breakout room" as a separate, full-fledged web conference (or a meeting). Because each room (e.g., the "main room" and the "breakout rooms") is a full web conference, there is a certain amount of server (or service) overhead associated with each breakout room. Also, joining a breakout room may be a slow process, as it typically requires a new connection to a server. It may be difficult for an instructor (e.g., a presenter in the web conference) to quickly switch from one breakout room to another breakout room. Similarly, an instructor who wishes to observe every room must be connected to every room's web conference, with all the attendant client-side overhead. Likewise, a student (e.g., a participant in the web conference) who is both in the main room and in a breakout room requires separate web conference clients for each, which generally increases central processing unit ("CPU") and memory consumption on the student's PC. Moreover, it may be difficult or time consuming to send a file, document, or other piece of content from room to room.

SUMMARY

A method, system, and architecture for providing a web conference system that efficiently provides a breakout room or multiple breakout rooms within a single web conference is provided. The web conference system architecture provides a web conference system that allows for the creation of breakout rooms within a single web conference, where each breakout room provides a named view onto each feature subsystem of the web conference, with or without separate permission levels on each view. Each breakout room may also provide a named view of the contents of the web conference, with or without separate permission levels on each view.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
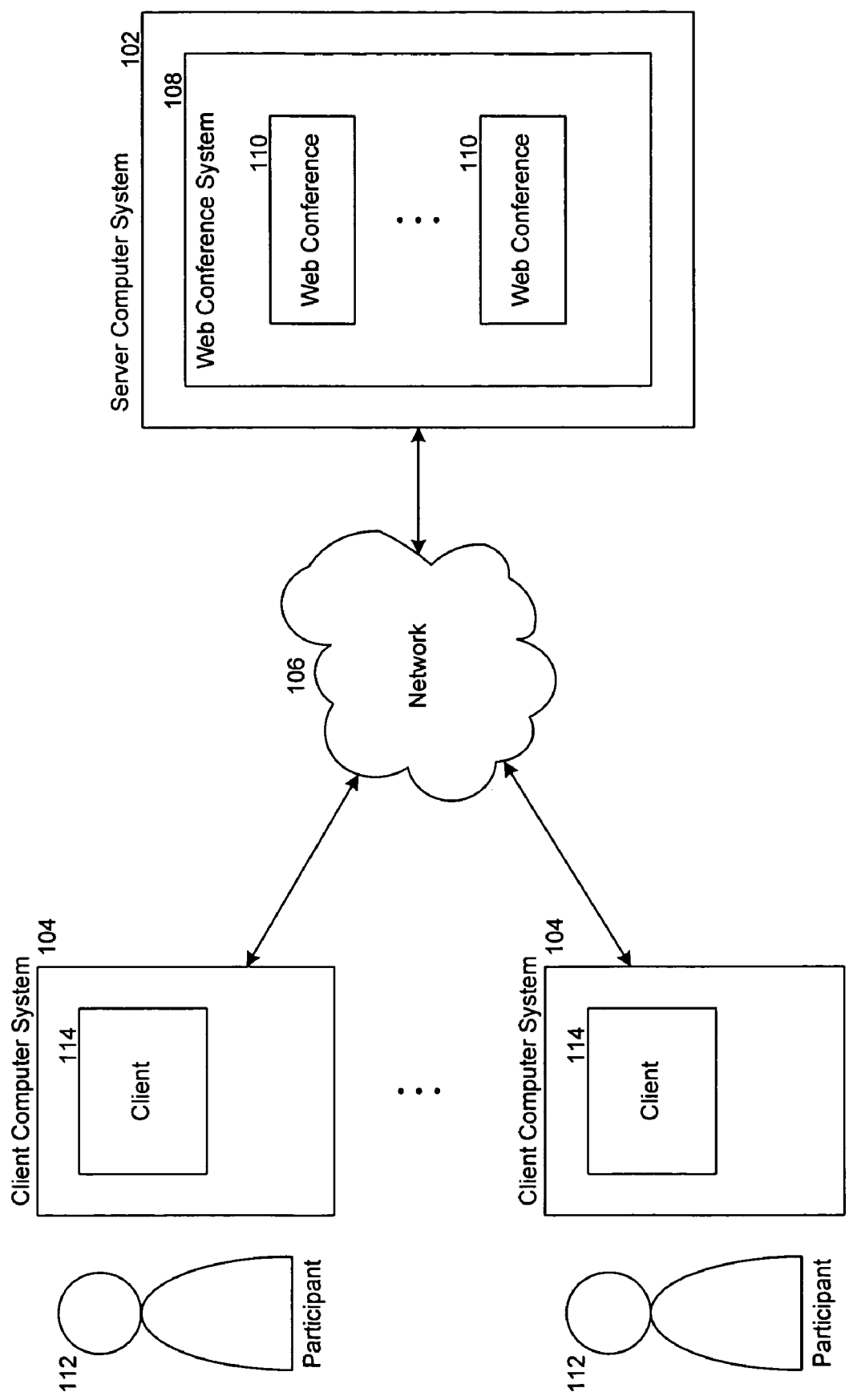
FIG. 1 is a high-level block diagram illustrating an example environment in which a web conference system illustratively operates.

A method, system, and architecture for providing a web conference system that efficiently provides a breakout room or multiple breakout rooms within a single web conference (also referred to herein interchangeably as a "meeting" or "virtual meeting") is provided. In some embodiments, the web conference system architecture provides a web conference system that allows for the creation of breakout rooms within a single web conference, where each breakout room provides a named view onto each feature subsystem of the web conference, with or without separate permission levels on each view. Each breakout room may also provide a named view of the contents of the web conference, with or without separate permission levels on each view.

Throughout the description, the following terms will generally have the following meanings:

The term "attendee" refers to an unprivileged user or an unprivileged participant in a meeting.

The term "breakout room" refers to a named scope.

The term "feature subsystem" or "interactive subsystem" refers to a set of features exposed by a web conference system. Each feature subsystem implements the set of features. A feature subsystem that is capable of expressing a scoped feature of itself is considered to be "scope-aware," and scope-aware feature subsystems may implement scoped features using scoped proxies. Typical feature subsystems include, but are not limited to, chat, question & answer (Q&A) manager, application sharing, attendee roster, document sharing, whiteboarding, file transfer, audio, video, slide viewer, voice-over-Internet Protocol (VoIP), attendee list manager, and the like.

The term "global scope" refers to the union of all content in a meeting, across all scopes, and including content that is not affiliated with any particular scope. The global scope is conceptually the main room.

The term "main room" refers to the global scope.

The term "named scope" is conceptually a subset of the content available in the global scope (e.g., main room), or it may have its own unique content which is not visible from the global scope. For example, slide sets from all rooms are visible to a presenter in a main room. If the presenter moves himself to a named scope, the presenter will only be able to view the slide sets that are assigned (or associated) with that named scope.

The term "participant" refers to a user who is connected to and in a meeting in any capacity.

The term "presenter" refers to a privileged user or a privileged participant in a meeting.

The term "privileged user" or "privileged participant" refers to a person in a meeting who can perform any allowable operation to or on any piece of content within any scope.

The term "scope" refers to a named portion or view of a meeting's content. Clients can act upon scopes without having knowledge of the content in other scopes.

The term "scoped data" refers to a subset of the data available to the feature subsystem, and which is used by the scoped proxy. For example, a scoped proxy of a slide viewer feature subsystem may have access to a partial list of the slide sets that are available to the slide viewer feature subsystem.

The term "scoped feature" refers to a feature that has a different behavior when in different scopes. For example, slide viewing is a scoped feature since it is possible to create and view different slides sets from different scopes.

The term "scoped proxy" refers to a manifestation of a single scope. Feature subsystems implement scoped features using scoped proxies. A scoped proxy of a feature subsystem implements a subset of the feature subsystem's functionality within the context of the feature subsystem's scoped data. Thus, a scoped proxy of a feature subsystem is a single representation or personality of the feature subsystem.

The term "unprivileged user" or "unprivileged participant" refers to a person in a meeting who can't do much of anything unless specific privileges are granted.

In some embodiments, the web conference system incorporates a scope manager that manages the creation and destruction of breakout rooms within a web conference, manages the movement of users (e.g., meeting participants) between various breakout rooms, including the main room, and notifies interested parties of these changes. The scope manager may be implemented as a subsystem within the web conference system. When the web conference system receives a request from a user to create a meeting, the web conference system creates a global scope or main room for the meeting. Within the web conference system, the meeting may be comprised of the scope manager and a collection of feature subsystems as dictated by the features which were requested to be made available during the meeting. For example, assuming that the meeting requestor requested document sharing, Q&A, and file transfer features to be available during the meeting, the meeting may be comprised of instances of the scope manager, the feature subsystem for document sharing, the feature subsystem for Q&A, and the feature subsystem for file transfer. The instances of the feature subsystems which were created for the meeting, along with their associated contents, may be conceptually thought of as the main room of the meeting. Stated differently, the feature subsystems which were created for the meeting, along with their associated contents, denote the main room of the meeting. The scope manager within a meeting is knowledgeable about every other feature subsystem in the meeting, and the scope manager responds to commands to create new breakout rooms (i.e., scopes) or destroy existing breakout rooms (i.e., scopes) within the meeting by issuing commands (or requests or events, etc.) to the feature subsystems in the meeting.

In some embodiments, when a user requests to join the meeting, the web conference system connects the user's client to the scope manager and each of the feature subsystems which comprise the meeting. In this manner, when the meeting participant first joins the meeting, the meeting participant's client interacts directly with each feature subsystem in the meeting, causing the meeting participant to participate in the main room of the meeting. Each meeting participant is assigned privileges which specify the actions the meeting participant can perform while interacting in the main room. The privileges may have been specified by the meeting presenter.

The web conference system may provide a user interface through which a meeting presenter or other privileged user who possesses the necessary privileges can request to create a breakout room within the meeting. When the web conference system receives a request to create a breakout room, the scope manager component of the meeting creates a scope for the requested breakout room within the meeting, generates a unique scope identifier (ID) for the newly created scope, and assigns a name to the scope. The name may have been provided by the presenter who requested the breakout room. The scope manager then instructs each of the feature subsystems in the meeting to create a scoped proxy for the scope ID. Each feature subsystem in the meeting responds by creating a scoped proxy to itself and assigning to the scoped proxy the specified scope ID to support the newly created scope. Each feature subsystem in the meeting exposes itself in a breakout room through its scoped proxy. The collection or set of scoped proxies created to support the scope form or comprise the breakout room within the meeting.

In some embodiments, the scoped proxy is implemented as a "thin" proxy, which acts as a filter or buffer to its corresponding feature subsystem. In a thin proxy implementation, the content (e.g., data, files, slide sets, etc.) associated with the feature subsystem and the logic and processing that is necessary to provide the feature remains with the feature subsystem. The scoped proxy contains the logic to enforce permissions by filtering requests to perform an action in the breakout room. For example, when the scoped proxy receives a request to perform an action, the scoped proxy checks the permissions of the meeting participant that requested the action against the privileges assigned to that participant within the breakout room. If the scoped proxy determines that the participant who requested the meeting has sufficient privileges to perform the action within the breakout room, the scoped proxy passes the action request to its corresponding feature subsystem, and the feature subsystem processes the requested action as if the action is being performed in the breakout room. Otherwise, if the scoped proxy determines that the participant who requested the meeting does not have sufficient privileges to perform the action within the breakout room, the scoped proxy can generate an appropriate error response.

In some embodiments, one or more of the scoped proxies created for a breakout room may contain some or all of the logic to perform the processing that is necessary to provide the feature. For example, one or more of the feature subsystems may not support the creation of thin proxies. When such a feature subsystem receives a request from the scope manager to create a scoped proxy for a scope ID (e.g., a breakout room), the feature subsystem may create another instance of itself and assign the specified scope ID to the created instance of itself. In this manner, the web conferencing system can support feature subsystems that are not capable of creating thin proxies, and the features provided by these feature subsystems can still be provided in the breakout rooms along with the features provided by the scope-aware feature subsystems.

The scope manager may then specify to each feature subsystem the contents that the feature subsystem is to expose through the scoped proxy. For example, the presenter who requested the breakout room may have specified the contents of the meeting that are to be made available in the breakout room. The presenter may have specified this information at the time of requesting the creation of the breakout room or subsequent to requesting the breakout room. Each feature subsystem in the meeting responds by exposing the specified contents through its scoped proxy that was created for the breakout room. The feature subsystem may expose an item of content by "marking" or otherwise indicating that the item of content is to be made available through the scoped proxy corresponding to the breakout room. In some embodiments, the feature subsystem can tag or annotate each item of content with metadata which associates the item of content with a particular scoped proxy or multiple scoped proxies. In this way, the feature subsystem does not have to physically move or copy the contents from the main room to affiliate the contents with the breakout room, and the contents can easily be moved from one room to another room in the meeting. The contents can also be easily affiliated with multiple rooms within the meeting. Moreover, by annotating each item of content, the feature subsystem is able to easily allocate separate resources for each of its scoped proxies. For example, a feature subsystem that provides whiteboarding can separate drawing information for each of its breakout rooms.

The scope manager may specify to each feature subsystem the meeting participants who are to be assigned to the breakout room, and each participant's permissions within the breakout room. For example, the presenter who requested the breakout room may have specified the participants in the meeting who are to participate in the breakout room, and each participant's permissions in the breakout room. The presenter may have specified this information at the time of requesting the creation of the breakout room or subsequent to requesting the breakout room. Each feature subsystem in the meeting responds by connecting each of the meeting participants' clients to the scoped proxy that was created for the breakout room by the feature subsystem. In some embodiments, the feature subsystem can associate an access control list (ACL) to the scoped proxy, and maintain the information pertaining to the assignment of the meeting participants to the scoped proxy (i.e., information regarding the participants who have been assigned to the breakout room), and each participant's privileges in the breakout room, in the ACL. In this way, a meeting participant's client interacts with a specific breakout room by interacting with each feature subsystem via the scoped proxy that the feature subsystem exposed for that breakout room. Moreover, the ACL allows each scoped proxy to a feature subsystem to impose different permissions. This enables a meeting participant to be granted more rights when operating via one scoped proxy (e.g., in one breakout room) than that participant would have when operating via a different scoped proxy (e.g., in another breakout room). In some embodiments, the feature subsystem maintains the connection between the client and the feature subsystem (e.g., the client's connection to the main room) even when the client is connected to a scoped proxy (e.g., the client's connection to a breakout room).

In some embodiments, the feature subsystem can also maintain a record that indicates, for each meeting participant, the meeting rooms (e.g., main room and any one or more of the breakout rooms) that the participant is assigned to. The feature subsystem may also maintain a record of the room that a participant is currently operating in. This allows the feature subsystem to process actions requested by a meeting participant through the appropriate scoped proxy, if the action was requested within a breakout room. In some embodiments, the participant's client may provide an indication of the room the participant is operating in. For example, when a participant is assigned to a breakout room, the participant's client may display a user interface (UI), such as a window, which allows the participant to participate in the breakout room. When the participant submits a request to perform an action using this UI, the client may provide an indication of the breakout room in which the participant requested the action, and the feature subsystem can process the requested action through the appropriate scoped proxy. In this way, a meeting participant may be assigned to multiple rooms in a meeting at the same time.

The web conference system may provide a user interface through which a meeting presenter or other privileged user who possesses the necessary privileges can request to terminate or close a breakout room within the meeting. When the web conference system receives a request to close a breakout room, the scope manager instructs each of the feature subsystems in the meeting to destroy the scoped proxy which was created by each of the feature subsystems to support the breakout room. Each feature subsystem in the meeting responds by destroying the relevant scoped proxy, and reassigning the meeting participants in the breakout room back into the main room. Each feature subsystem also identifies the items of content that are affiliated with the destroyed scoped proxy and re-affiliates the items of content to the main room.

In some embodiments, the global scope contains the union of the contents of all of the other scopes. This allows the meeting presenters and other privileged participants to observe every breakout room in a meeting even from within the main room of the meeting.

FIG. 1 is a high-level block diagram illustrating an example environment in which a web conference system illustratively operates. The environment is only one example of a suitable operating environment and is not intended to suggest any limitation as to the scope of use or functionality of the web conference system. As depicted, the environment comprises a server computer system 102 and a plurality of client computer systems 104, each coupled to a network 106. The server computer system serves as a computing platform on which a web conference system 108 executes. The web conference system "hosts" a plurality of web conferences 110, and provides the conferencing services to the conference or meeting participants 112. Each participant may execute a client application 114 on his or her client computer system to access the web conference system and participate in a web conference or multiple web conferences. The clients executing on the client computer systems enable the participants at the client computer systems to interact with the web conference system. Only one server computer system is shown in FIG. 1 for simplicity and one skilled in the art will appreciate that the web conference system may be distributed over multiple server computer systems.

In general terms, the network is a communications link that facilitates the transfer of electronic content between, for example, the attached target machine, management server and content servers. In some embodiments, the network includes the Internet. It will be appreciated that the network may be comprised of one or more other types of networks, such as a local area network, a wide area network, a point-to-point dial-up connection, and the like.

The computing device on which the web conferencing system is implemented, including the client and server computing systems, may include a central processing unit, memory, input devices (e.g., keyboard and pointing devices), output devices (e.g., display devices), and storage devices (e.g., disk drives). The memory and storage devices are computer-readable media that may contain instructions that implement the web conferencing system. In addition, the data structures and message structures may be stored or transmitted via a data transmission medium, such as a signal on a communications link. Various communication links may be used, such as the Internet, a local area network, a wide area network, a point-to-point dial-up connection, a cell phone network, and so on.

Embodiments of the web conferencing system may be implemented in various operating environments that include personal computers, server computers, hand-held or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The web conferencing system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
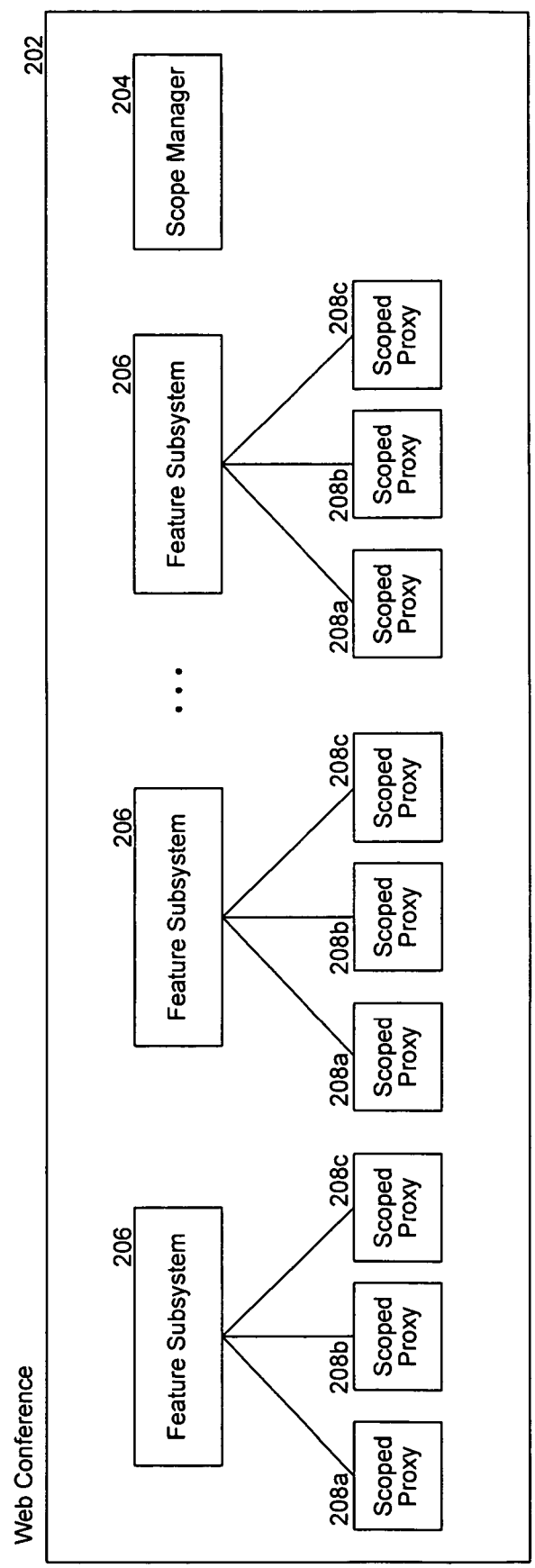
FIG. 2 is a block diagram that illustrates selected components of a web conference, according to some embodiments.

FIG. 2 is a block diagram that illustrates selected components of a web conference 202, according to some embodiments. As depicted, the web conference comprises a scope manager 204 and a plurality of feature subsystems 206. The scope manager manages scope creation, destruction, naming, and any information pertinent to the management of the feature subsystems contained in the web conference, and the feature subsystems' scoped proxies. Each feature subsystem provides a feature or set of features that are exposed in the web conference by the web conference system. The feature subsystems include, but are not limited to, chat, application sharing, attendee roster, document sharing, whiteboarding, file transfer, audio, video, etc. As depicted in FIG. 2, each feature subsystem is shown associated with a plurality of scoped proxies 208a-c. When a feature subsystem is instructed to create a breakout room having a specified scope ID, the feature subsystem creates a scoped proxy to itself. Each of the scoped proxies provides a named view onto its corresponding feature subsystem, and the collection of scoped proxies having the same name or scope ID provides a single view onto a common shared data model or breakout room within the web conference. By way of example, the collection of scoped proxies 208a comprise one breakout room, the collection of scoped proxies 208b comprise another breakout room, and the collection of scoped proxies 208c comprise still another breakout room within the same web conference.

Figure 3:
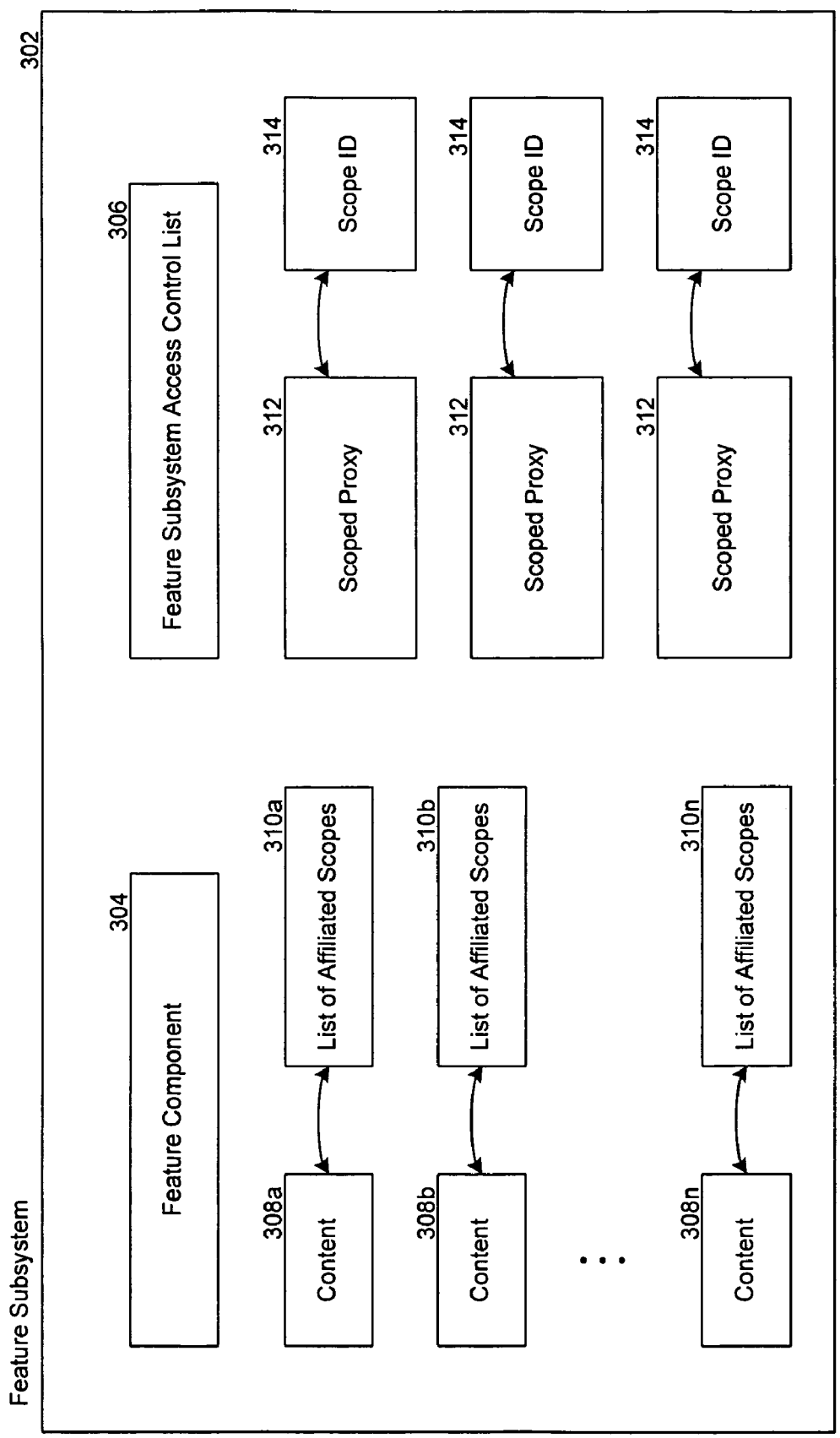
FIG. 3 is a block diagram that illustrates selected components of a feature subsystem, according to some embodiments.

FIG. 3 is a block diagram that illustrates selected components of a feature subsystem 302, according to some embodiments. As depicted, the feature subsystem comprises a feature component 304, a feature subsystem access control list (ACL) 306, a plurality of contents 308a-n, and a plurality of scoped proxies 312. The feature component provides the functionalities associated with the feature or features provided by the feature subsystem. For example, if the feature subsystem provides file sharing capabilities, the feature component contains the logic that implements the file sharing functionalities. The feature subsystem ACL specifies the permissions or access rights that are associated with the feature subsystem. For example, the feature subsystem ACL may specify the rights each participant or group of participants has while interacting directly with the feature subsystem. Because the global scope of a web conference is comprised of the feature subsystems themselves, interacting with the feature subsystem is akin to interacting in the main room of the web conference. Thus, the feature subsystem ACL specifies the participant's rights while participating in the main room of the web conference. The content is a piece of information, such as, by way of example, individual file, document, resource, etc., that is in or which is associated with the feature subsystem. For example, in the case of a file sharing feature subsystem, an item of content may be a specific file. In the case of a Q&A feature subsystem, an item of content may be a set of questions and answers. In the case of a slide viewer feature subsystem, an item of content may be a specific slide set. Each item of content 308a-n is associated with a corresponding list of affiliated scopes 310a-n. The list of affiliated scopes is metadata that specifies the scopes to which the associated item of content is affiliated with. In some embodiments, each item of content is always affiliated with the global scope, even when the item of content is further affiliated with one or more named scopes. Each of the scoped proxies provides a proxy representation of the feature subsystem, and functions as a conduit to a named subset of the feature subsystem's contents. Each scoped proxy 312 is associated with a corresponding scope ID 314. Each scope ID uniquely identifies a named scope within the web conference, and the collection of scoped proxies that are associated with the same scope ID provides a single named view onto the contents of the web conference.

Figure 4:
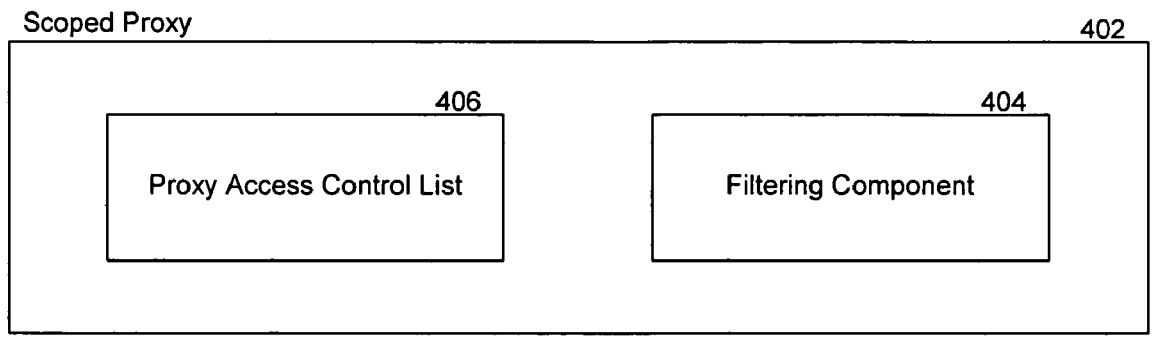
FIG. 4 is a block diagram that illustrates a thin scoped proxy created by a scope-aware feature subsystem, according to some embodiments.

FIG. 4 is a block diagram that illustrates a thin scoped proxy 402 created by a scope-aware feature subsystem, according to some embodiments. The thin scoped proxy is a manifestation of the feature subsystem in a named scope of the web conference. As depicted, the thin scope proxy comprises a filtering component 404 and a proxy access control list (ACL) 406. The proxy ACL specifies the permissions or access rights granted to the participants in the web conference while interacting through the thin scoped proxy. The filtering component filters the actions that are requested through the thin scoped proxy according to the privileges and rights specified in the proxy ACL. For example, when the thin scoped proxy receives a request to perform an action, the filtering component checks the requested action against the proxy ACL to determine whether the requested action is an authorized action. Upon determining that the requested action is an authorized action, the filtering component forwards the requested action to the feature component of the feature subsystem for processing of the action. The thin scoped proxy contains the filtering logic and not the feature functionality.

Figure 5:
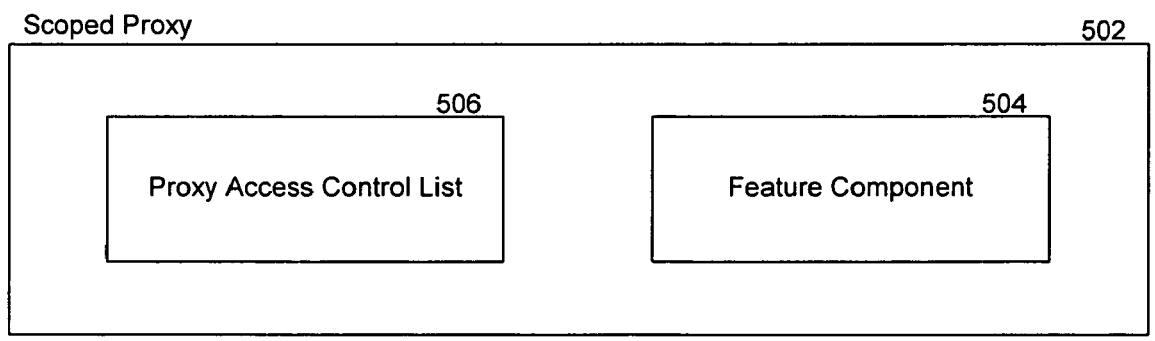
FIG. 5 is a block diagram that illustrates a scoped proxy created by a feature subsystem that is not scope-aware, according to some embodiments.

FIG. 5 is a block diagram that illustrates a scoped proxy 502 created by a feature subsystem that is not scope-aware, according to some embodiments. As depicted, the scoped proxy comprises a feature component 504 and a proxy access control list (ACL) 506. The proxy ACL specifies the permissions or access rights granted to the participants in the web conference while interacting through the scoped proxy. The feature component is an instance of the logic that implements the functionalities associated with the feature or features provided by the feature subsystem. The feature component processes the actions that are requested through the scoped proxy according to the privileges and rights specified in the proxy ACL. Here, the feature component is similar to the feature component described in FIG. 4 in that the feature component processes the requested actions.

Figure 6:
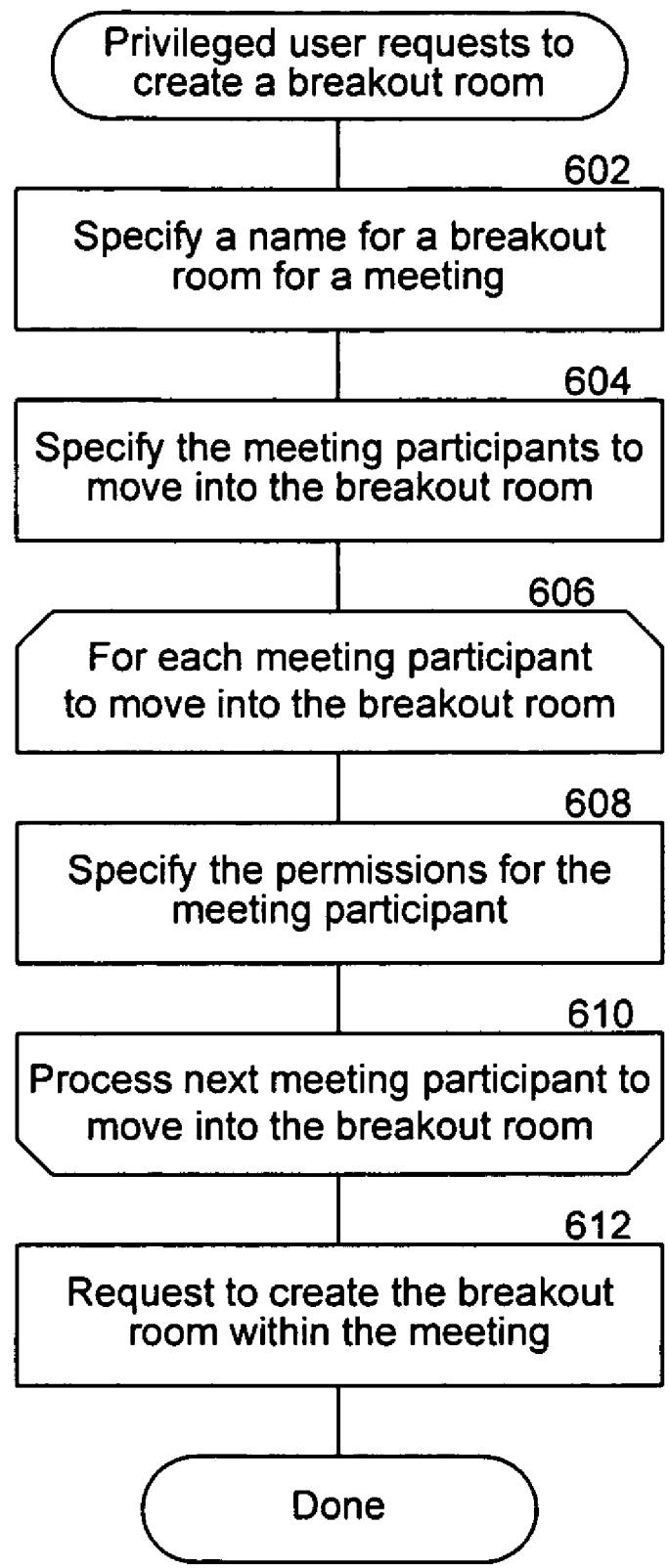
FIG. 6 is a flow diagram showing the illustrative steps performed by a meeting presenter to create a breakout room within a meeting, according to some embodiments.

FIG. 6 is a flow diagram showing the illustrative steps performed by a meeting presenter to create a breakout room within a meeting, according to some embodiments. By way of example, a meeting presenter, while participating in a meeting provided by the web conference system, may decide to create a breakout room within the meeting. In block 602, the meeting presenter specifies a name for a breakout room for the meeting. In block 604, the meeting presenter specifies the meeting participants to move into the breakout room. For each specified meeting participant (block 606), the meeting presenter specifies the permissions for the meeting participant within the breakout room in block 608, until the permissions for all of the specified meeting participants have been specified (block 610). In block 612, the meeting presenter submits the request to create the breakout room within the meeting. The meeting presenter may input the information required to request the breakout room through a UI presented on the presenter's client by the web conferencing system. The features that are to be provided in the breakout room may be determined from the privileges that are specified for each of the meeting participants. In some embodiments, the meeting presenter may also explicitly specify the features that are to be provided in the breakout room. In some embodiments, the meeting presenter may specify the contents that are to be made available within the breakout room.

One skilled in the art will appreciate that, for this and other processes and methods disclosed herein, the functions performed in the processes and methods may be implemented in differing order. Furthermore, the outlined steps are only exemplary, and some of the steps may be optional, combined with fewer steps, or expanded into additional steps.

Figure 7:
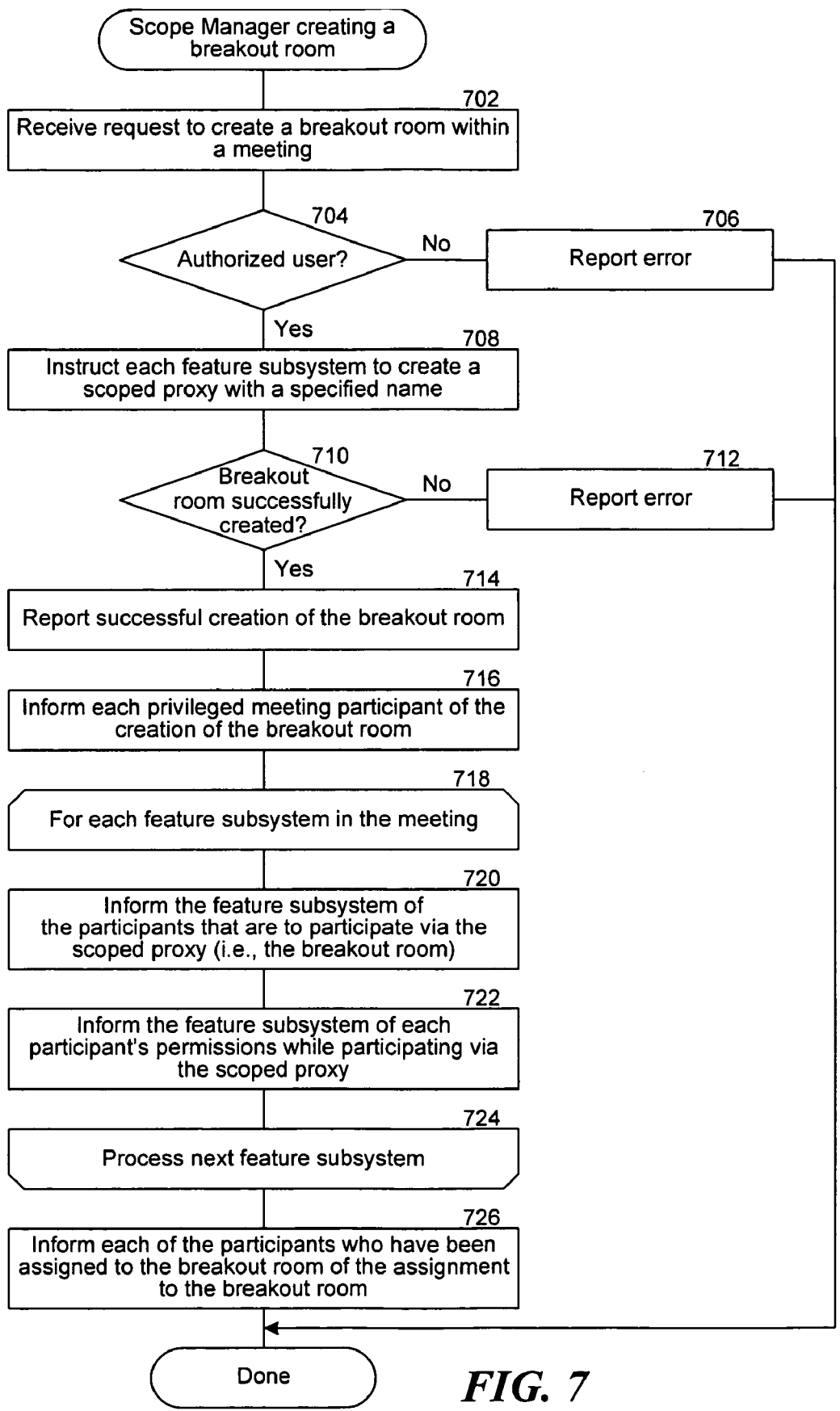
FIG. 7 is a flow diagram that illustrates the processing of a scope manager to create a breakout room, according to some embodiments.

FIG. 7 is a flow diagram that illustrates the processing of a scope manager to create a breakout room, according to some embodiments. In block 702, the scope manager component of a meeting receives a request to create a breakout room within the meeting. In block 704, the scope manager checks to determine if the user who requested the creation of the breakout room is authorized to create a breakout room. If the user is not authorized to create a breakout room, then, in block 706, the scope manager reports the error. Otherwise, if the user who requested the creation of the breakout room is authorized to create a breakout room, then, in block 708, the scope manager instructs each feature subsystem in the meeting to create a scoped proxy with a specified name. The specified name may be the name of the breakout room specified by the requester of the breakout room. In some embodiments, the scope manager may create a scope ID that uniquely identifies the requested breakout room within the meeting, associate the scope ID to the name of the breakout room, and instruct each feature subsystem of the meeting to create a scoped proxy and identify the scope proxy with the scope ID.

In block 710, the scope manager checks to determine if the breakout room was successfully created. For example, the scope manager determines whether it received an indication that each of the subsystems successfully created a scoped proxy. If the breakout room was not successfully created, then, in block 712, the scope manager reports the error. Otherwise, if the breakout room was successfully created, then, in block 714, the scope manager reports the successful creation of the requested breakout room. For example, the scope manager may cause an indication to appear on the breakout room requestor's client that indicates the successful creation of the breakout room. In block 716, the scope manager informs each of the privileged meeting participants of the creation of the breakout room within the meeting.

Then, for each feature subsystem in the meeting (block 718), the scope manager per-forms blocks 720 to 722, until all of the feature subsystems in the meeting are processed (block 724). In block 720, the scope manager informs the feature subsystem of the participants that are to participate via the scoped proxy exposed by the feature subsystem. In block 722, the scope manager informs the feature subsystem of each participant's permissions while participating via the scoped proxy. One skilled in the art will appreciate that, depending on the permissions specified by the user who requested the breakout room, one or more of the feature subsystems may not have any participants participating via its scoped proxy. This allows for a breakout room to not offer a feature or features that are offered in the main room of the meeting. In block 726, the scope manager informs each of the participants who have been assigned to the breakout room of the assignment to the breakout room. In some embodiments, the scope manager may provide an indication of the assignment to a breakout room to the participant's client, and the client may display a UI that includes an indication of the participant's assignment to the breakout room. The displayed UI may also provide an interface through which the participant can operate within the breakout room.

In some embodiments, the scope manager may create an empty breakout room within a meeting. For example, a meeting presenter may have requested to create a breakout room but may not have specified the meeting participants to assign to the breakout room. In this instance, the scope manager creates an empty breakout room within the meeting, and may subsequently place meeting participants into the breakout room. For example, the meeting presenter who requested the breakout room, or other privileged user with sufficient permissions, may assign some or all of the meeting participants to an existing breakout room. In some embodiments, the scope manager may automatically assign some or all of the meeting participants to the breakout room instead of creating an empty breakout room.

Figure 8:
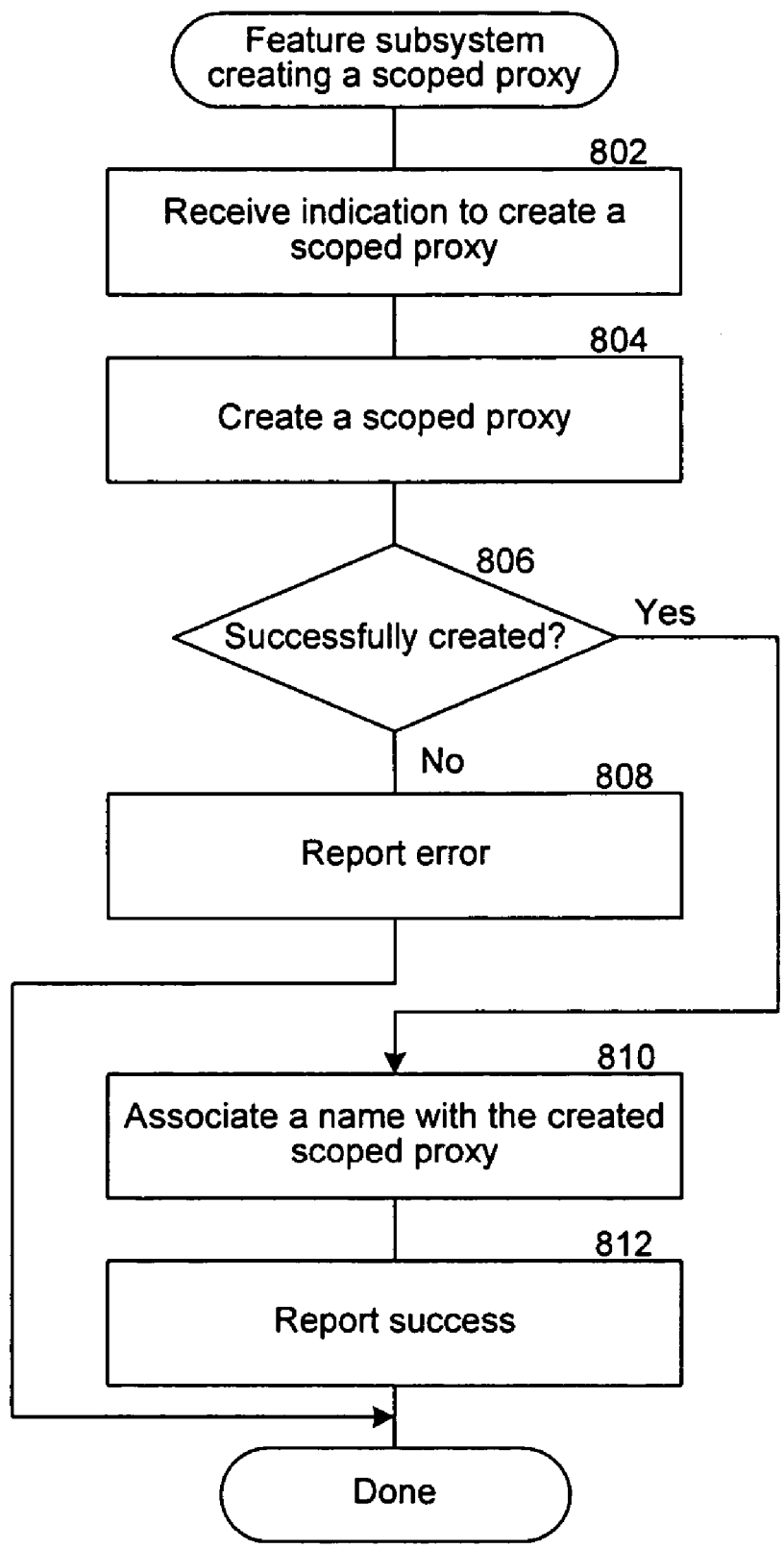
FIG. 8 is a flow diagram that illustrates the processing of a feature subsystem to create a scoped proxy, according to some embodiments.

FIG. 8 is a flow diagram that illustrates the processing of a feature subsystem to create a scoped proxy, according to some embodiments. In block 802, the feature subsystem receives an indication to create a scoped proxy. In block 804, the feature subsystem creates the requested scoped proxy. In block 806, the feature subsystem checks to determine if it was able to successfully create the scoped proxy. If the feature subsystem was not able to successfully create the scoped proxy, then, in block 808, the feature subsystem reports the error. For example, the feature subsystem may return an error to the scope manager informing the scope manager of the unsuccessful creation of the requested scoped proxy. Otherwise, if the feature subsystem was able to successfully create the scoped proxy, then, in block 810, the feature subsystem associates a name with the created scoped proxy. The name may be the name of the breakout room represented by the scoped proxy. In block 812, the feature subsystem reports the successful creation of the requested scoped proxy, for example, to the scope manager.

Figure 9:
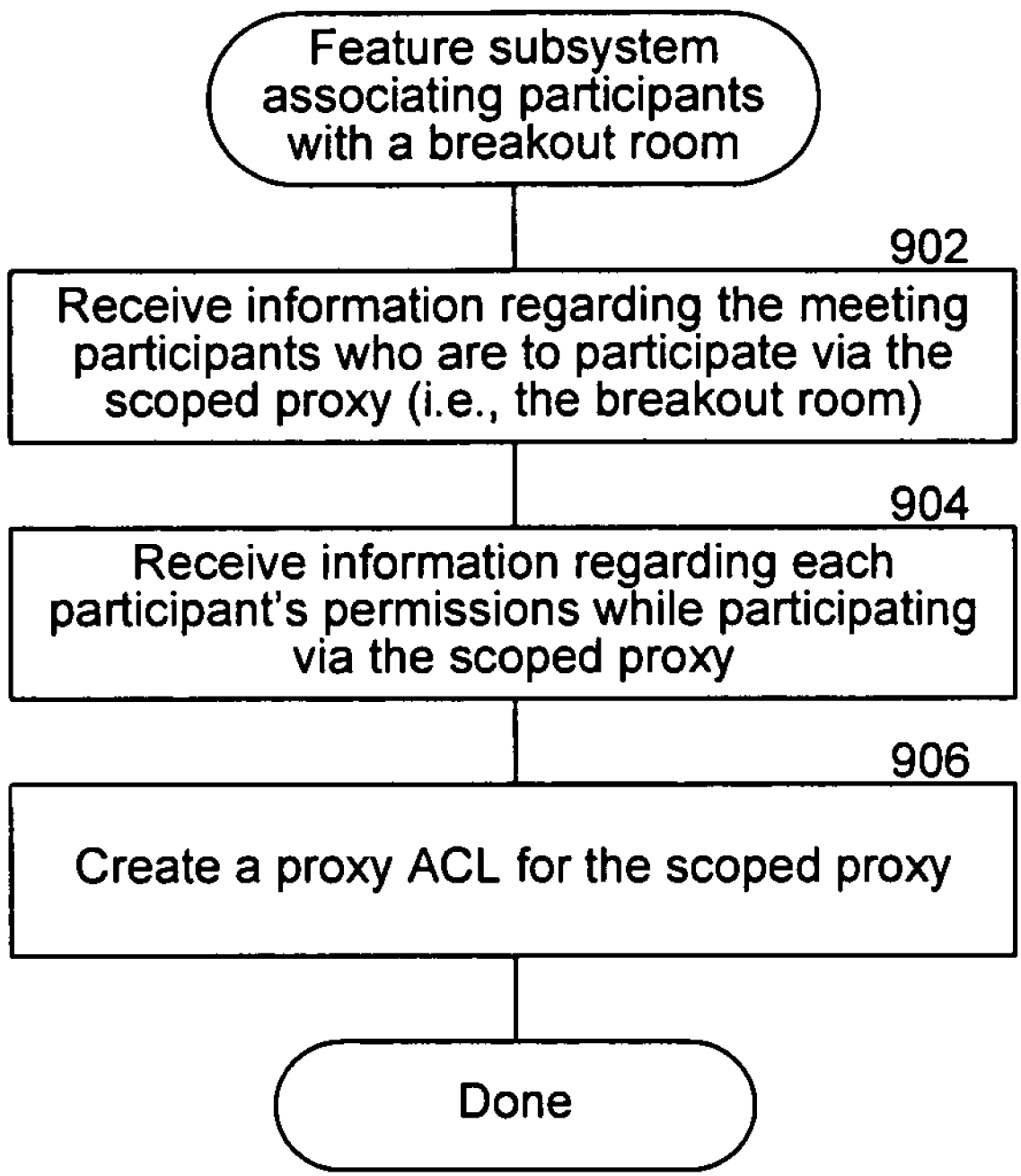
FIG. 9 is a flow diagram that illustrates the processing of a feature subsystem to associate meeting participants with a breakout room, according to some embodiments.

FIG. 9 is a flow diagram that illustrates the processing of a feature subsystem to associate meeting participants with a breakout room, according to some embodiments. In block 902, the feature subsystem receives information regarding the meeting participants who are to participate via the scoped proxy. In block 904, the feature subsystem receives information regarding each participant's permissions while participating via the scoped proxy. In block 906, the feature subsystem creates a proxy ACL for the scoped proxy. In some embodiments, the feature subsystem associates an item or items of content to the scoped proxy. For example, for each item of content specified to be made available through the scoped proxy, the feature subsystem can include in the list of affiliated scopes of each item of content an indication of the scope represented by the scoped proxy. In some embodiments, for each participant assigned to the breakout room, the feature subsystem connects the participant's client to the scoped proxy that was created for the breakout room by the feature subsystem.

Figure 10:
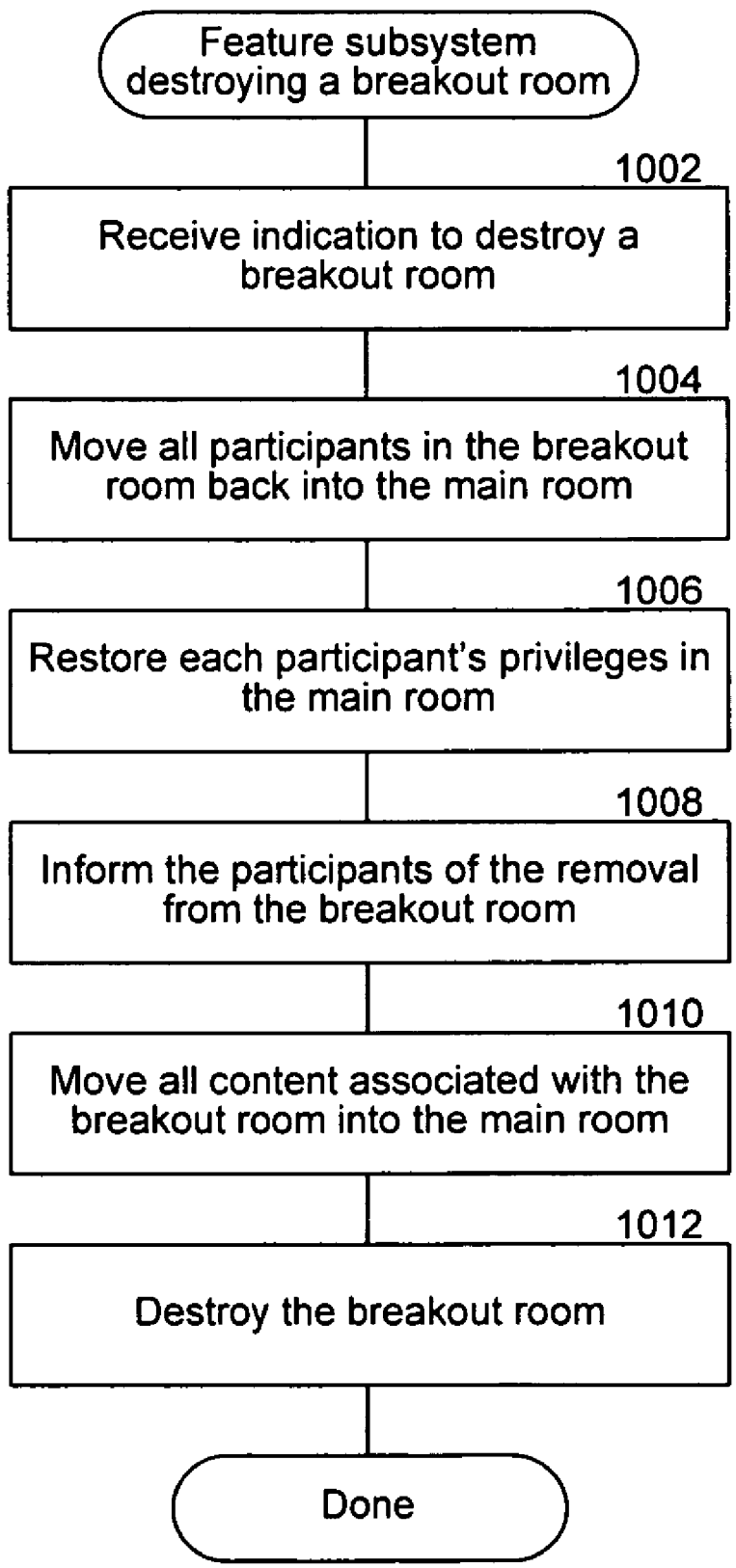
FIG. 10 is a flow diagram that illustrates the processing of a feature subsystem to destroy a breakout room, according to some embodiments.

FIG. 10 is a flow diagram that illustrates the processing of a feature subsystem to destroy a breakout room, according to some embodiments. By way of example, a scope manager component of a meeting may instruct each of the feature subsystems to close or destroy a breakout room created within the meeting. In block 1002, a feature subsystem receives an indication to destroy a breakout room. In block 1004, the feature subsystem moves all participants who are participating in the breakout room back into the main room of the meeting. In block 1006, the feature subsystem restores each participant's privileges in the main room. For example, a participant may have been provided different privileges in the breakout room than in the main room of the meeting. When this participant is moved back into the main room, the feature subsystem restores the participant's privileges to those privileges assigned to the participant in the main room.

In block 1008, the feature subsystem informs the participants of the removal from the breakout room. In some embodiments, the feature subsystem may provide an indication of the removal of the participant from the breakout room to the participant's client. The client may then provide an indication of the removal from the breakout room and remove or no longer display the UI which allowed the participant to operate within the breakout room. The client may display or re-display the UI to the main room of the web conference. In block 1010, the feature subsystem moves all content that is associated with the breakout room into the main room of the meeting. For example, for each item of content that is associated with the breakout room, the feature subsystem may remove from its list of affiliated scopes the indication of the scope that is to be destroyed (e.g., the breakout room), and if not already present, include in the list of affiliated scopes an indication of the global scope (e.g., the main room). In block 1012, the feature subsystem destroys the breakout room. For example, the feature subsystem destroys the scoped proxy that the feature subsystem created for the breakout room.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

I claim:

1. A method in a web conference system having a processor and memory for providing a breakout room, comprising:
    providing by the web conference system a web conference comprising multiple feature subsystems, each feature subsystem providing a set of one or more features in the web conference, wherein the multiple feature subsystems denote a main room of the web conference, the main room having a global scope;
    when the web conference system receives a request to create a first breakout room having a first name within the web conference,
        creating a first scoped proxy to each of the multiple feature subsystems in the main room of the web conference, each of the first scoped proxies providing a view onto its corresponding feature subsystem wherein at least one of the first scoped proxies provides a first subset of the set of one or more features that is different from a second subset of the set of one or more features; and
        associating the first name to each of the first scoped proxies, wherein the collection of the first scoped proxies associated with the first name denote the first breakout room within the web conference, and further wherein meeting participants assigned to the first breakout room participate in the first breakout room by interacting with the multiple feature subsystems via each feature subsystem's first scoped proxy;
    when the web conference system receives a request to create a second breakout room having a second name within the web conference,
        creating a second scoped proxy to each of the multiple feature subsystems, each of the second scoped proxies providing a view onto its corresponding feature subsystem; and
        associating the second name to each of the second scoped proxies, wherein the collection of the second scoped proxies associated with the second name comprise the second breakout room within the web conference, and further wherein meeting participants assigned to the second breakout room participate in the second breakout room by interacting with the multiple feature subsystems via each feature subsystem's second scoped proxy,
    wherein the first scoped provides the first subset of features provided in the global scope, the second scoped proxy provides the second subset of the features provided in the global scope, and the first scooped proxy provides at least one feature that is not provided the second scoped proxy;
    wherein when the web conference system receives a request to destroy the first breakout room within the web conference,
        moving all meeting participants assigned to the first breakout room back into the main room of the web conference; and
        moving all content associated with the first breakout room into the main room of the web conference.

2. The method of claim 1, wherein at least one of the first scoped proxies is a thin scoped proxy.

3. The method of claim 1, further comprising:
    assigning at least one web conference participant to the first breakout room; and
    creating an ACL for each of the first scoped proxies, wherein the ACL specifies, for each meeting participant assigned to the first breakout room, the meeting participant's permissions while participating in the first breakout room.

4. The method of claim 3, wherein the meeting participant's permissions specify the actions the meeting participant can perform while participating in the first breakout room.

5. The method of claim 3, wherein the meeting participant's permissions specify the contents the meeting participant can act on while participating in the first breakout room.

6. The method of claim 1, further comprising, specifying for each of the first scoped proxies, content that is to be exposed through the first scoped proxy.

7. The method of claim 6, wherein the specified content is a subset of the corresponding feature subsystem's contents.

8. The method of claim 1, further comprising, upon successfully creating the first breakout room within the web conference, informing each privileged participant in the web conference of the creation of the first breakout room.

9. The method of claim 1, further comprising informing all meeting participants moved from the first breakout room of their removal from the first breakout room.

10. The method of claim 1, further comprising, for each meeting participant moved from the first breakout room back into the main room of the web conference, restoring the meeting participant's privileges in the main room.

11. A subsystem-scoping web conference system comprising:
　a processor and memory storing one or more components implemented in software;
　a component that provides at least one virtual meeting, the virtual meeting having a global scope and comprising:
　　a scope manager component that manages the creation and destruction of breakout rooms within the virtual meeting; and
　　at least one feature subsystem that, upon receiving an instruction to create a first breakout room, creates a first scoped proxy to itself, the first scoped proxy providing a manifestation of the feature subsystem in the first breakout room, the first scoped proxy representing a named view of the feature subsystem's contents, and upon receiving an instruction to create a second breakout room, creates a second scoped proxy to itself, the second scoped proxy providing a manifestation of the feature subsystem in the second breakout room, the second scoped proxy presenting a named view of the feature subsystem's contents;
　wherein a client interacting in the first breakout room interacts with the feature subsystem via the first scoped proxy created for the first breakout room by the feature subsystem, a client interacting in the second breakout room interacts with the feature subsystem via the second scoped proxy created for the second breakout room by the feature subsystem, wherein the first scoped proxy provides a first subset of features provided in the global scope, the second scoped proxy provides a second subset of the features provided in the global scope, and the first scoped proxy provides at least one feature that is not provided by the second scoped proxy;
　wherein when the web conference system receives a request to destroy the first breakout room within the web conference,
　　moving all meeting participants assigned to the first breakout room back into the main room of the web conference; and
　　moving all content associated with the first breakout room into the main room of the web conference.

12. The system of claim 11, wherein the feature subsystem further exposes an item of content in the feature subsystem through the scoped proxy.

13. The system of claim 12, wherein the exposing the item of content through the scoped proxy includes annotating the item of content without physically moving the item of content.

14. The system of claim 11, wherein the feature subsystem further creates an ACL for the scoped proxy, wherein the ACL specifies permissions for meeting participants who are interacting via the scoped proxy.

15. A computer-readable storage medium containing instructions for a web conference system to provide a breakout room within a virtual meeting, by a method comprising:
　providing a virtual meeting having a global scope comprising a plurality of feature subsystems, each feature subsystem providing a feature or multiple features in the web conference;
　when the web conference system receives a request to create a first breakout room having a first name within the virtual meeting,
　　generating a first scope ID;
　　associating the first scope ID with the first name;
　　creating a first scoped proxy to each of the plurality of feature subsystems, each of the scoped proxies providing a view onto its corresponding feature subsystem; and
　　assigning the first scope ID to each of the scoped proxies, when the web conference system receives a request to create a second breakout room having a second name within the virtual meeting,
　　generating a second scope ID;
　　associating the second scope ID with the second name;
　　creating a second scoped proxy to each of the plurality of feature subsystem, each of the scoped proxies providing a view onto its corresponding feature subsystem; and
　　assigning the second scope ID to each of the scoped proxies,
　wherein the collection of the scoped proxies having a same scope ID denote the breakout room having the name within the virtual meeting, and the first scoped proxy provides a first subset of features provided in the global scope, the second scoped proxy provides a second subset of the features provided in the global scope, and the first scoped proxy provides at least one feature that is not provided by the second scoped proxy;
　wherein when the web conference system receives a request to destroy the first breakout room within the web conference,
　　moving all meeting participants assigned to the first breakout room back into the main room of the web conference; and
　　moving all content associated with the first breakout room into the main room of the web conference.

16. The computer-readable storage medium of claim 15, including exposing contents through the breakout room by annotating the contents to associate the contents with the scoped proxy without physically moving the contents.

17. The computer-readable storage medium of claim 15, including creating an ACL for each of the scoped proxies, wherein the ACL specifies permissions for meeting participants who are interacting via its corresponding scoped proxy.

18. The computer-readable storage medium of claim 15, wherein each of the scoped proxies is a thin scoped proxy that filters actions that are requested through the thin scoped proxy to determine whether the actions are authorized.

* * * * *